(12) United States Patent
Zhang et al.

(10) Patent No.: US 12,195,355 B2
(45) Date of Patent: Jan. 14, 2025

(54) HIGH SALINITY WASTEWATER TREATMENT SYSTEM

(71) Applicant: TONGJI UNIVERSITY, Shanghai (CN)

(72) Inventors: Yalei Zhang, Shanghai (CN); Xuefei Zhou, Shanghai (CN); Yinchuan Yang, Shanghai (CN); Jiabin Chen, Shanghai (CN); Lei Wang, Shanghai (CN); Xinmiao Zhang, Shanghai (CN); Wenbiao Wang, Shanghai (CN); Yegang Chen, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 399 days.

(21) Appl. No.: 17/851,176

(22) Filed: Jun. 28, 2022

(65) Prior Publication Data

US 2022/0411286 A1 Dec. 29, 2022

(30) Foreign Application Priority Data

Jun. 28, 2021 (CN) .......................... 202110718088.0

(51) Int. Cl.
*C02F 1/00* (2023.01)
*B01D 15/14* (2006.01)
(Continued)

(52) U.S. Cl.
CPC .............. *C02F 1/006* (2013.01); *B01D 15/14* (2013.01); *B01D 15/18* (2013.01); *B01D 15/1892* (2013.01); *B01J 20/28047* (2013.01); *C02F 1/004* (2013.01); *C02F 1/285* (2013.01); *C02F 1/286* (2013.01); *C02F 2101/20* (2013.01); *C02F 2103/34* (2013.01); *C02F 2201/003* (2013.01); *C02F 2201/005* (2013.01)

(58) Field of Classification Search
None
See application file for complete search history.

(56) References Cited

U.S. PATENT DOCUMENTS

7,648,630 B2 * 1/2010 Broussard ............... C02F 1/001
 210/275
11,485,651 B1 * 11/2022 Zhang .................... B01D 15/02
(Continued)

*Primary Examiner* — Robert J Popovics
(74) *Attorney, Agent, or Firm* — Locke Lord LLP; Tim Tingkang Xia, Esq.

(57) ABSTRACT

A high salinity wastewater treatment system is provided according to the present application, which includes a hydrogel loading system and a flow-storage different-oriented-inlet-and-outlet system. The hydrogel loading system includes six separation plates, a wastewater treatment area, a water distribution bin, a rotating shaft, a driving motor and a fixed bracket. The six separation plates evenly separate the wastewater treatment area into six separate treatment sectors in an axial direction. The six separate treatment sectors are filled with hydrogel materials with water purification effect. The high salinity wastewater infiltrates into each separate treatment sector one by one through high salinity wastewater inlet meshes on a surface of the wastewater treatment area, and the purified high salinity wastewater is discharged through a wastewater cleaning outlet pipe with a same water inlet direction as a cleaning filler distribution pipe.

10 Claims, 5 Drawing Sheets

(51) Int. Cl.
   *B01D 15/18*    (2006.01)
   *B01J 20/28*    (2006.01)
   *C02F 1/28*     (2023.01)
   *C02F 101/20*   (2006.01)
   *C02F 103/34*   (2006.01)

(56) References Cited

U.S. PATENT DOCUMENTS

| | | | | |
|---|---|---|---|---|
| 2003/0010691 | A1* | 1/2003 | Broussard | B01D 24/08 |
| | | | | 210/243 |
| 2009/0230042 | A1* | 9/2009 | Broussard | C02F 1/004 |
| | | | | 210/275 |
| 2013/0180904 | A1* | 7/2013 | Broussard | C02F 1/004 |
| | | | | 210/232 |
| 2015/0258474 | A1* | 9/2015 | Broussard | B01D 35/05 |
| | | | | 210/257.1 |
| 2022/0119599 | A1* | 4/2022 | Zhang | C01G 49/08 |
| 2022/0410034 | A1* | 12/2022 | Zhang | B01D 15/22 |
| 2022/0411286 | A1* | 12/2022 | Zhang | B01D 15/14 |

* cited by examiner

HIGH SALINITY WASTEWATER TREATMENT SYSTEM

CROSS-REFERENCE TO RELATED PATENT APPLICATION

This non-provisional application claims priority to and the benefit of, pursuant to 35 U.S.C. § 119(a), patent application Serial No. CN202110718088.0 filed in China on Jun. 28, 2021. The disclosure of the above application is incorporated herein in its entirety by reference.

FIELD

The present application relates to the technical field of environmental engineering, and in particular to a high salinity wastewater treatment system.

BACKGROUND

As the main component of industrial production wastewater, high salinity wastewater has become a major environmental protection problem for industrial development and wastewater treatment at the present stage because of its large amount of discharge and high treatment difficulty.

The unqualified discharge of high salinity wastewater may not only cause the waste of salt resource and water resource, but also cause serious environmental pollution. Since salinity is an important environmental factor in the water environment, and it has a direct or indirect impact on the growth and reproduction of aquatic organisms. When the salinity of the water environment increases sharply, it may result in the osmotic imbalance between aquatic species and their living environment, causing cell dehydration, lowering swelling pressure, and then causing plasmolysis and metabolic imbalance, and even death. In addition, the salinity of the nearby soil may also increase, which results in the degradation of soil structure and adversely affects soil ecology. Therefore, efficient treatment of the high salinity wastewater and recovery of inorganic salts and water resources from the high salinity wastewater are of great significance to solving the problems of resource shortage and environmental pollution.

The high salinity wastewater has complex composition and high concentration, which is likely to cause blockage and abnormal operation of the treatment process and equipment. Therefore, the high salinity wastewater must be yielded to a pre-treatment process before a formal process to reduce and detoxify the concentration of some pollutants. The existing technologies mainly include biological method, chemical method and physical method. Biological method is a method of wastewater treatment by using the metabolism and reproduction of microorganisms. However, heavy metals and other substances in the high salinity wastewater may destroy the life structure of the microorganisms, inhibit their growth and reproduction, and even cause cell inactivation. The chemical method is a method of wastewater treatment by using chemical agents, which has high cost and may cause secondary pollution. The physical method is a method of wastewater treatment by separating some pollutants from a wastewater system by physical means such as adsorption, flocculation and coagulation. This method is more feasible compared with the above two methods, but it still has the following problems to be solved: (1), the existing technology requires desorption or backwashing after adsorption or filtration, and can only operate intermittently, and several parallel processes are generally provided to operate alternately, which is still intermittent in nature and increases the initial investment and operation costs; (2), the mass of the adsorbent is large, which increases the total weight of the equipment, thus increasing the operation costs such as power consumption; (3), the existing adsorbent has insufficient adsorption effect. As a new lightweight material, hydrogel has a good adsorption effect on pollutants, but its application in the field of the high salinity wastewater treatment is rarely reported.

Therefore, it is urgent to develop a treatment system that can not only use hydrogel to efficiently treat high salinity wastewater, but also can continuously operate, which is of great significance to the existing environmental protection industry and ecological environmental protection.

SUMMARY

In view of the above disadvantages, a high salinity wastewater treatment system is provided according to the present application, which uses hydrogel for high salinity wastewater treatment, fully utilizes its advantages of large adsorption capacity and light weight, can effectively improve the high salinity wastewater treatment effect, and further reduce the operation costs.

The following technical solutions are provided according to the present application: a high salinity wastewater treatment system includes a hydrogel loading system and a flow-storage different-oriented-inlet-and-outlet system which is nested in the hydrogel loading system;

the hydrogel loading system includes six separation plates, a wastewater treatment area with a hollow cylindrical structure, a cylindrical water distribution bin located at an axis of the wastewater treatment area, a rotating shaft fixedly connected with the six separation plates, a driving motor driving the rotating shaft to rotate, and a fixing bracket fixedly connected with the driving motor and configured to support the hydrogel loading system; each separation plate is arranged to protrude from an outer surface of the wastewater treatment area;

the six separation plates are evenly distributed in the wastewater treatment area of the hydrogel loading system, and evenly separate the wastewater treatment area into six separate treatment sectors in an axial direction: a first separate treatment sector, a second separate treatment sector, a third separate treatment sector, a fourth separate treatment sector, a fifth separate treatment sector, and a sixth separate treatment sector; the six separate treatment sectors are inside filled with hydrogel materials with water purification effect;

the wastewater treatment area, the water distribution bin and the rotating shaft are coaxial with each other;

the flow-storage different-oriented-inlet-and-outlet system includes a high salinity wastewater inlet pipe, high salinity wastewater inlet meshes located on the outer surface of the wastewater treatment area below the high salinity wastewater inlet pipe, a wastewater cleaning outlet pipe and a cleaning filler water distribution pipe which are located in the water distribution bin, a cleaning filler water inlet pipe configured to deliver water to and connect with the cleaning filler water distribution pipe, a pipe separation plate, and a water outlet pipe connected with the wastewater cleaning outlet pipe;

the high salinity wastewater inlet meshes are provided on the surface of the wastewater treatment area, and the high salinity wastewater introduced from the high salinity wastewater inlet pipe flows into the uppermost separate treatment sector through the high salinity wastewater inlet meshes;

the wastewater cleaning outlet pipe and the cleaning filler water distribution pipe are arranged in the water distribution bin and have a same flow direction in the axial direction, and the pipe separation plate separates the wastewater cleaning outlet pipe from the cleaning filler water distribution pipe in a radial vertical direction of the water distribution bin; the wastewater cleaning outlet pipe and the cleaning filler water distribution pipe are tangent to an inner wall of the water distribution bin;

the wastewater cleaning outlet pipe is provided with a row of wastewater cleaning outlet holes opening vertically upward in the axial direction and arranged in sequence; and the cleaning filler water distribution pipe is provided with a row of cleaning filler water distribution holes opening vertically downward in the axial direction and arranged in sequence.

Furthermore, a diameter of the water distribution bin ranges from 100 mm to 350 mm, the water distribution bin includes a water distribution bin housing and at least one row of water distribution outlet holes. The at least one row of water distribution outlet holes are arranged in sequence on a surface of the water distribution bin housing, opening vertically upward in the axial direction and facing the first separate treatment sector. Centers of the row of wastewater cleaning outlet holes are in one-to-one correspondence with centers of one row of water distribution outlet holes at the first separate treatment sector; and a filter screen is placed on a contact surface between each separate treatment sector and the water distribution bin, and a hole diameter of the filter screen ranges from 20% to 75% of a diameter of each water distribution outlet hole.

Furthermore, a diameter of each wastewater cleaning outlet hole ranges from 110% to 120% of a diameter of the corresponding water distribution outlet hole; and the diameter of each water distribution outlet hole ranges from 2 mm to 6 mm.

Furthermore, a diameter of the water outlet pipe ranges from 100 mm to 250 mm; the wastewater cleaning outlet pipe is provided with a wastewater cleaning outlet baffle which is distributed on a pipe wall of the wastewater cleaning outlet pipe, so that the water flowing out from the wastewater treatment area enters the wastewater cleaning outlet pipe and does not flow into the water distribution bin.

Furthermore, the number of rows of the water distribution outlet holes arranged in sequence on the surface of the water distribution bin housing in the axial direction is six, and the six rows of the water distribution outlet holes are evenly distributed along a circumferential direction of a cross-section of the water distribution bin.

Furthermore, a cleaning water inlet check valve is arranged on the cleaning filler water inlet pipe to control water inlet of the cleaning filler water inlet pipe, and a diameter of the cleaning filler water inlet pipe ranges from 20% to 30% of the diameter of the water distribution bin.

Furthermore, the cleaning filler water distribution pipe is provided with a cleaning filler water distribution baffle; the cleaning filler water distribution baffle is distributed on a pipe wall of the cleaning filler water distribution pipe, so that the water flowing out from the cleaning filler water distribution pipe enters the wastewater treatment area and does not flow into the water distribution bin.

Furthermore, the high salinity wastewater inlet meshes are arranged outside the wastewater treatment area, and the high salinity wastewater inlet meshes located in the separate treatment sectors are independently arranged, and a hole diameter of each high salinity wastewater inlet mesh ranges from 2 mm to 10 mm.

Furthermore, a cleaning water storage area is provided directly below the wastewater treatment area, and the cleaning water storage area is configured to receive the water flowing out of the cleaning wastewater treatment area from the cleaning filler water distribution pipe.

Furthermore, a thickness of the hydrogel filler in each separate treatment sector ranges from 300 mm to 800 mm, and a filling rate of the built-in hydrogel material ranges from 60% to 90%; each separation plate is welded to the water distribution bin and subjected to waterproof treatment; the six separation plates are made of stainless steel; and the water distribution bin has a cylindrical water distribution bin housing which has a diameter ranging from 200 mm to 2500 mm and is made of stainless steel.

The present application has the following advantages.

(1) a special structure is innovatively used according to the present application to realize the independent and non-influencing operation of each separate purification sector, the special structure has strong controllability, reduces the processing complexity, and further reduces the operation costs and labor input;

(2) the flow-storage different-oriented-inlet-and-outlet system is innovatively used according to the present application to realize the uninterrupted operation of the system and the continuous treatment of high salinity wastewater, and can realize the short-term water storage function, which has a good engineering application prospect;

(3) the different-oriented-inlet-and-outlet holes are innovatively used according to the present application to realize the in and out of the high salinity wastewater, which improves the space utilization rate of the system according to the present application;

(4) the hydrogel is innovatively used for high salinity wastewater treatment according to the present application, which fully utilizes its advantages of large adsorption capacity and light weight, can effectively improve the high salinity wastewater treatment effect, and further reduce the operation costs;

(5) the circumferentially sequential operation of the purification units is innovatively realized according to the present application, which can achieve the function of stirring and cleaning the filler, is convenient for the cleaning of the filler, and greatly improves the operating life of the system;

(6) the system according to the present application has good compatibility and an adjustable length-to-width ratio, and can be mounted in parallel or in series according to the site conditions, which has a low restriction on the use site, and is convenient for popularization and application;

(7) in terms of market development, since high salinity wastewater is a major environmental protection problem faced by industrial development and wastewater treatment, the system according to the present application not only has important social, environmental and ecological significance, but also has broad market prospects; and as a new technology for high salinity wastewater treatment, the system according to the present application is necessary for ecological environment governance, so it is a rigid demand;

(8) in terms of engineering construction, the high salinity wastewater treatment system provided according to the present application has strong applicability and can be applied to different types of high salinity wastewater, and furthermore, it can be applied to the upgrade of existing industrial parks so as to avoid environmental pollution caused by unqualified discharge of the high salinity wastewater, and has good engineering application value; and (9) in terms of technology development, high salinity wastewater treatment is a hot and difficult point in the field of water treatment, breakthroughs in new materials and new processes for solving such technical problems can effectively fill the vacancies of professional technology in related fields, and effectively promote technology development.

BRIEF DESCRIPTION OF THE DRAWINGS

The present application will be described in more detail below on the basis of embodiments and with reference to the accompanying drawings.

Reference numerals in the drawings are listed as follows:

| | |
|---|---|
| 1-hydrogel loading system; | 11-separation plate; |
| 12-wastewater treatment area; | 121-first separate treatment sector; |
| 122-second separate treatment sector; | 123-third separate treatment sector; |
| 124-fourth separate treatment sector; | 13-water distribution bin; |
| 131-water distribution bin housing; | 132-water distribution outlet hole; |
| 14-rotating shaft; | 15-fixing bracket; |
| 17-filter screen; | 18-driving motor; |
| 2-flow-storage different-oriented-inlet-and-outlet system; | |
| 20-water outlet pipe; | 201-high salinity wastewater inlet mesh; |
| 21-wastewater cleaning outlet pipe; | 211-wastewater cleaning outlet hole; |
| 212-wastewater cleaning outlet baffle; | 22-cleaning filler water distribution pipe; |
| 220-cleaning water inlet check valve; | |
| 221-cleaning filler water distribution hole; | |
| 222-cleaning filler water distribution baffle; | |
| 223-cleaning filler water inlet pipe; | 23-high salinity wastewater inlet pipe; |
| 24-pipe separation plate; | 25-cleaning water storage area. |

DETAILED DESCRIPTION OF THE EMBODIMENTS

Technical solutions in the embodiments of the present application are clearly and completely described hereinafter in conjunction with the drawings in the embodiments of the present application. Apparently, the embodiments described in the following are only some embodiments of the present application, rather than all embodiments. Based on the embodiments in the present application, all of other embodiments, made by the person skilled in the art without any creative efforts, fall into the scope of protection of the present application.

First Embodiment

Figure 1:
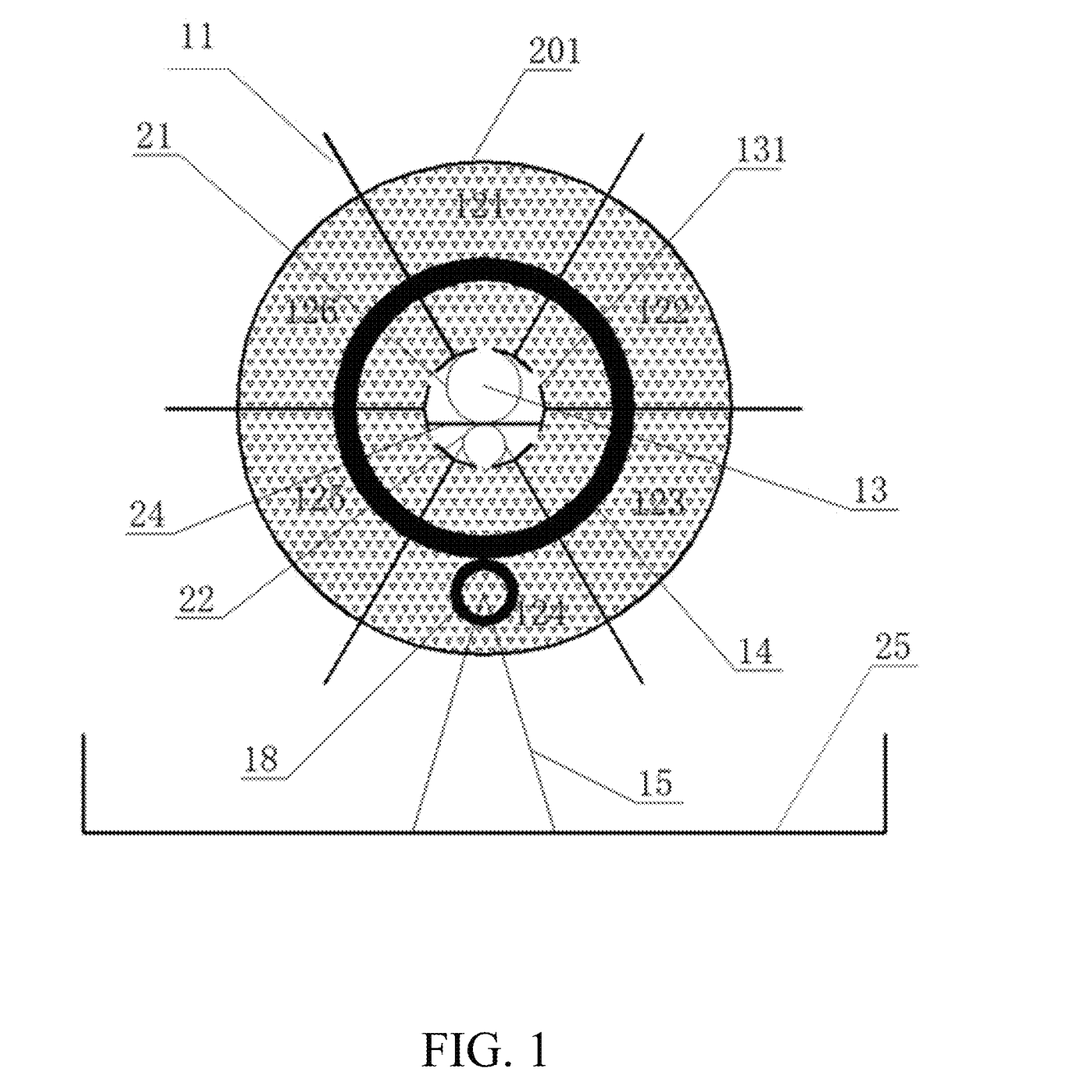
FIG. 1 is an axial cross-sectional view of a high salinity wastewater treatment system provided according to the present application.
Figure 2:
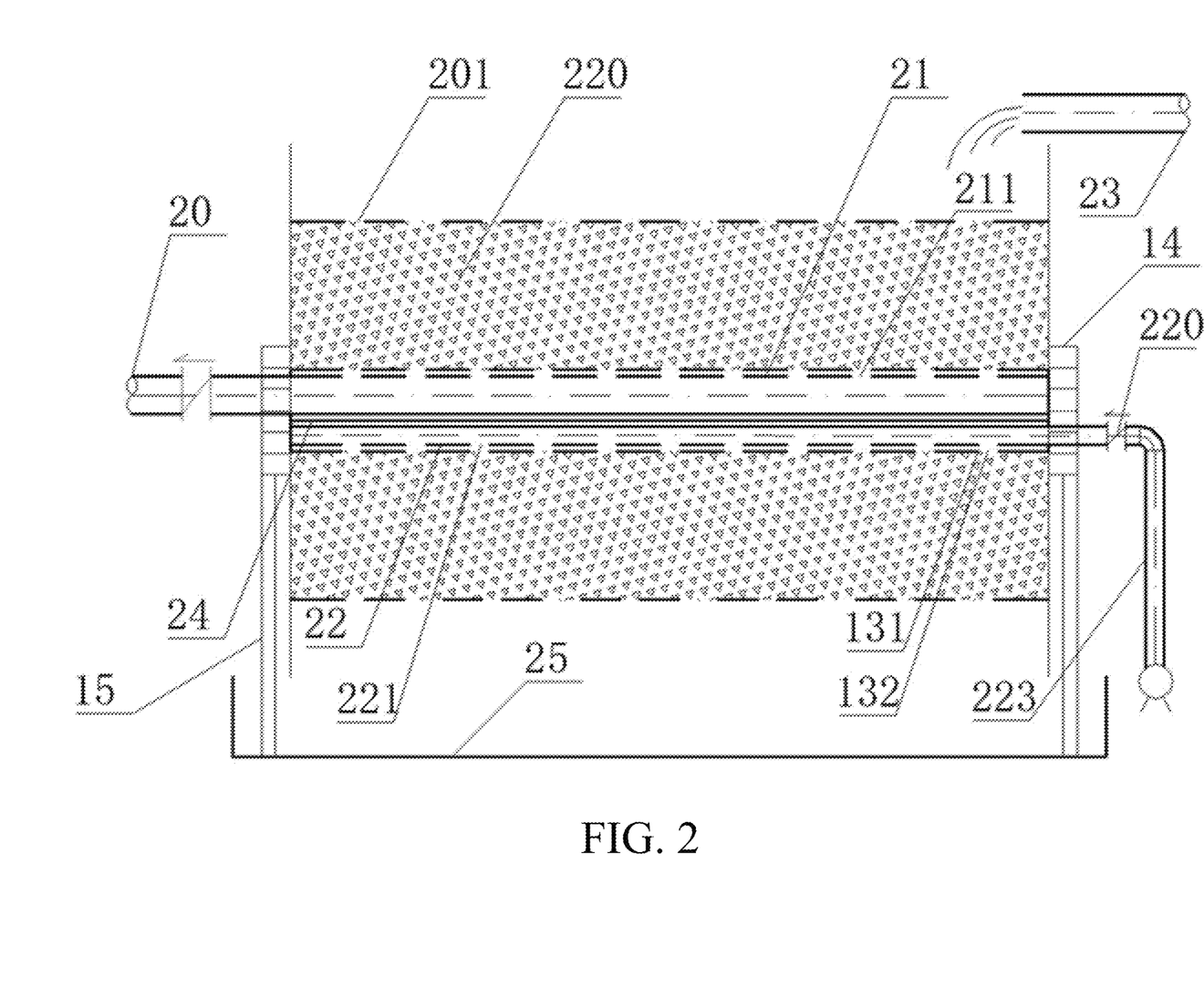
FIG. 2 is a front view of the high salinity wastewater treatment system provided according to the present application.

As shown in FIG. 1 and FIG. 2, a high salinity wastewater treatment system is provided, and the high salinity wastewater herein is wastewater with a total salt content of 1% to 5% by mass, and the system includes a hydrogel loading system 1 and a flow-storage different-oriented-inlet-and-outlet system 2 which is nested in the hydrogel loading system 1.

Figure 3:
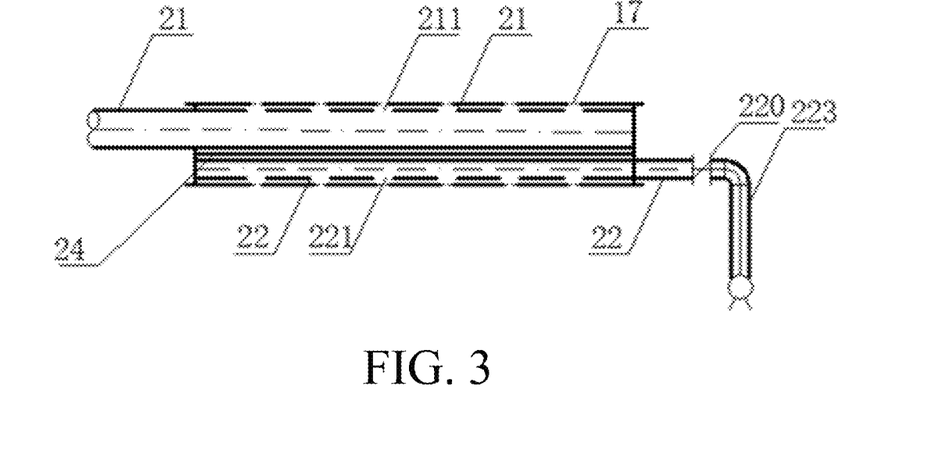
FIG. 3 is a detailed view of a flow-storage different-oriented-inlet-and-outlet system with a wastewater cleaning outlet pipe and a cleaning filler water distribution pipe in the system provided according to the present application.

As shown in FIG. 1, the hydrogel loading system 1 includes six separation plates 11, a wastewater treatment area 12 with a hollow cylindrical structure, a cylindrical water distribution bin 13 located at an axis of the wastewater treatment area 12, a rotating shaft 14 fixedly connected with the six separation plates 11, a driving motor 18 driving the rotating shaft 14 to rotate, and a fixing bracket 15 fixedly connected with the driving motor 18 and configured to support the hydrogel loading system 1; each separation plate 11 is arranged to protrude from an outer surface of the wastewater treatment area 12;

the six separation plates 11 are evenly distributed in the wastewater treatment area 12 of the hydrogel loading system 1, and evenly separate the wastewater treatment area 12 into six separate treatment sectors in an axial direction: a first separate treatment sector 121, a second separate treatment sector 122, a third separate treatment sector 123, a fourth separate treatment sector 124, a fifth separate treatment sector 125, and a sixth separate treatment sector 126; the six separate treatment sectors are inside filled with hydrogel materials with water purification effect;

the wastewater treatment area 12, the water distribution bin 13 and the rotating shaft 14 are coaxial with each other;

as shown in FIG. 3, the flow-storage different-oriented-inlet-and-outlet system 2 includes a high salinity wastewater inlet pipe 23, high salinity wastewater inlet meshes 201 located on the outer surface of the wastewater treatment area 12 below the high salinity wastewater inlet pipe 23, a wastewater cleaning outlet pipe 21 and a cleaning filler water distribution pipe 22 which are located in the water distribution bin 13, a cleaning filler water inlet pipe 223 configured to deliver water to and connect with the cleaning filler water distribution pipe 22, a pipe separation plate 24, and a water outlet pipe 20 connected with the wastewater cleaning outlet pipe 21;

the high salinity wastewater inlet meshes 201 are provided on the surface of the wastewater treatment area 12, and the high salinity wastewater introduced from the high salinity wastewater inlet pipe 23 flows into the uppermost separate treatment sector through the high salinity wastewater inlet meshes 201;

as shown in FIG. 2, the wastewater cleaning outlet pipe 21 and the cleaning filler water distribution pipe 22 are arranged in the water distribution bin 13 and have a same flow direction in the axial direction, and the pipe separation plate 24 separates the wastewater cleaning outlet pipe 21 from the cleaning filler water distribution pipe 22 in a radial vertical direction of the water distribution bin 13; the wastewater cleaning outlet pipe 21 and the cleaning filler water distribution pipe 22 are tangent to an inner wall of the water distribution bin 13;

the wastewater cleaning outlet pipe 21 is provided with a row of wastewater cleaning outlet holes 211 opening vertically upward in the axial direction and arranged in sequence; and the cleaning filler water distribution pipe 22 is provided with a row of cleaning filler water distribution holes 221 opening vertically downward in the axial direction and arranged in sequence.

A diameter of the water distribution bin 13 is 100 mm. As shown in FIG. 2, the water distribution bin 13 includes a water distribution bin housing 131 and at least one row of water distribution outlet holes 132. The at least one row of water distribution outlet holes 132 are arranged in sequence on a surface of the water distribution bin housing 131, opening vertically upward in the axial direction and facing the first separate treatment sector 121. Centers of the row of wastewater cleaning outlet holes 211 are in one-to-one correspondence with centers of one row of water distribution outlet holes 132 at the first separate treatment sector 121; and as shown in FIG. 3, a filter screen 17 is placed on a contact surface between each separate treatment sector and the water distribution bin 13, and a hole diameter of the filter screen 17 is 20% of a diameter of each water distribution outlet hole 132.

A diameter of each wastewater cleaning outlet hole 211 ranges from 110% to 120% of a diameter of the corresponding water distribution outlet hole 132; and the diameter of each water distribution outlet hole 132 is 2 mm.

Figure 4:
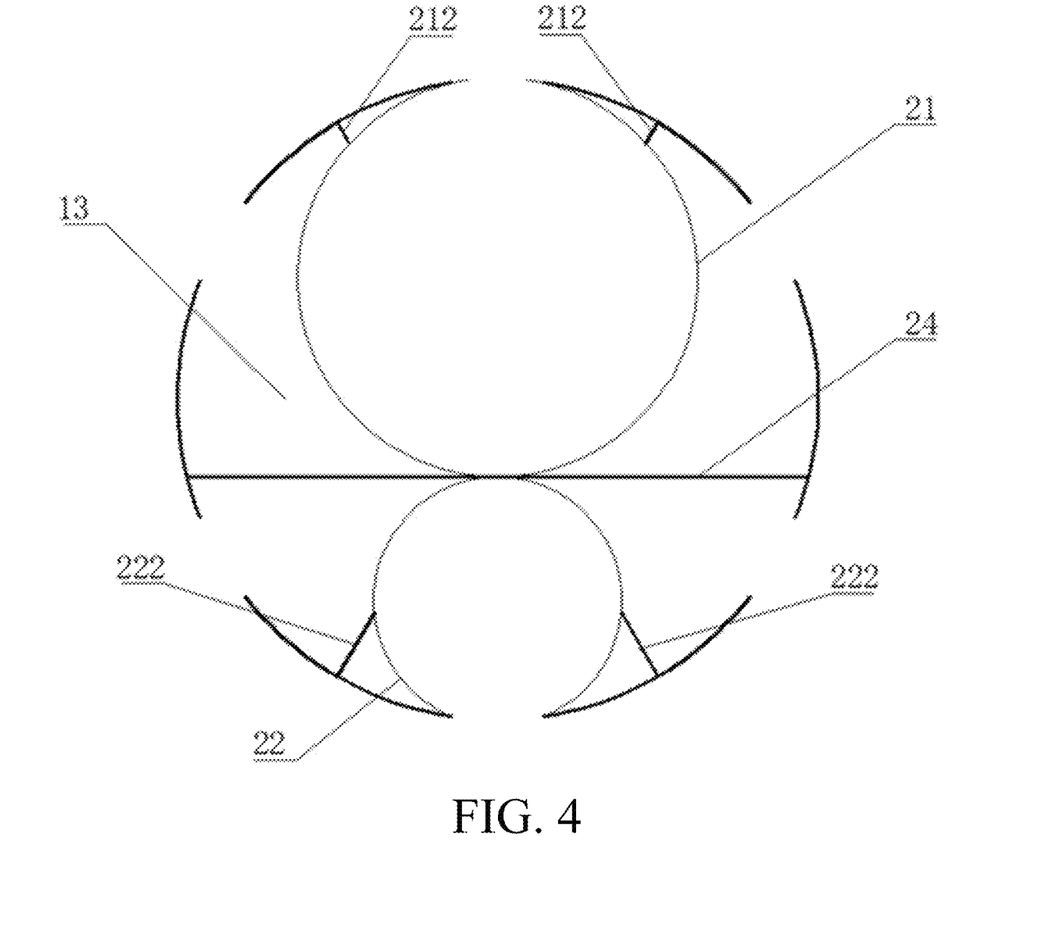
FIG. 4 is an axial cross-sectional view of the wastewater cleaning outlet pipe, the cleaning filler water distribution pipe and a water distribution bin in the system provided according to the present application.
Figure 5:
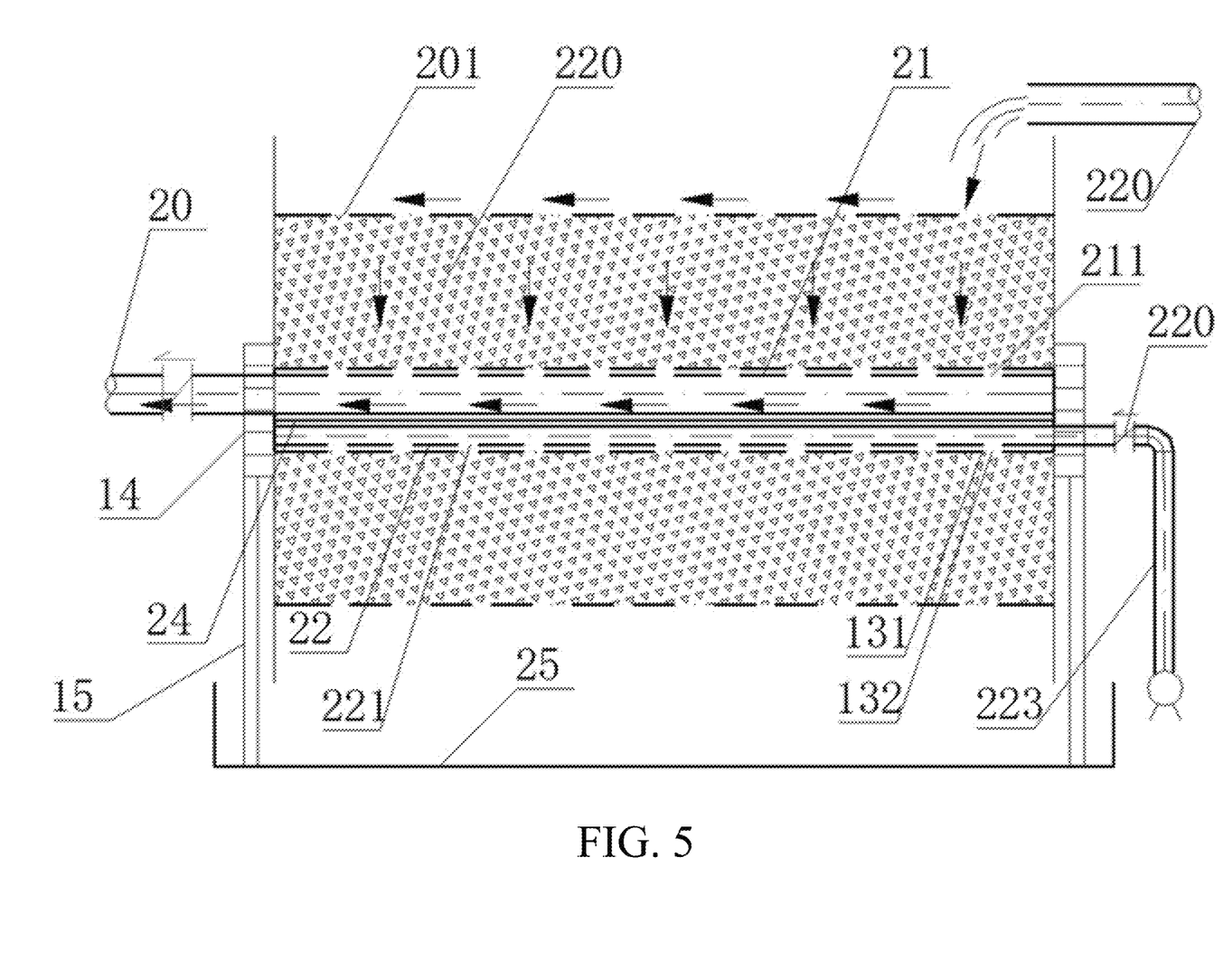
FIG. 5 is a front view of the high salinity wastewater treatment system, provided according to the present application, in steps S1 to S3 during operation.

A diameter of the water outlet pipe 20 is 100 mm; the wastewater cleaning outlet pipe 21 is provided with a wastewater cleaning outlet baffle 212. As shown in FIG. 4, the wastewater cleaning outlet baffle 212 is distributed on a pipe wall of the wastewater cleaning outlet pipe 21, so that the water flowing out from the wastewater treatment area 12 enters the wastewater cleaning outlet pipe 21 and does not flow into the water distribution bin 13.

As shown in FIG. 3, the number of rows of the water distribution outlet holes 132 arranged in sequence on the surface of the water distribution bin housing 131 in the axial direction is six, and the six rows of the water distribution outlet holes 132 are evenly distributed along a circumferential direction of a cross-section of the water distribution bin 13. Further, the six rows of the water distribution outlet holes 132 correspond to the first separate treatment sector 121, the second separate treatment sector 122, the third separate treatment sector 123, the fourth separate treatment sector 124, the fifth separate treatment sector 125, and the sixth separate treatment sector 126 respectively, and one row of the water distribution outlet holes 132 is provided in each separate treatment sector.

As shown in FIG. 2 and FIG. 3, a cleaning water inlet check valve 220 is arranged on the cleaning filler water inlet pipe 223 to control water inlet of the cleaning filler water inlet pipe 223, and a diameter of the cleaning filler water inlet pipe 223 is 20% of the diameter of the water distribution bin 13.

As shown in FIG. 4, the cleaning filler water distribution pipe 22 is provided with a cleaning filler water distribution baffle 222; the cleaning filler water distribution baffle 222 is distributed on a pipe wall of the cleaning filler water distribution pipe 21, so that the water flowing out from the cleaning filler water distribution pipe 21 enters the wastewater treatment area 12 and does not flow into the water distribution bin 13.

As shown in FIG. 1, the high salinity wastewater inlet meshes 201 are arranged outside the wastewater treatment area 12, and the high salinity wastewater inlet meshes 201 located in the separate treatment sectors are independently arranged, and a hole diameter of each high salinity wastewater inlet mesh 201 is 2 mm.

Figure 6:
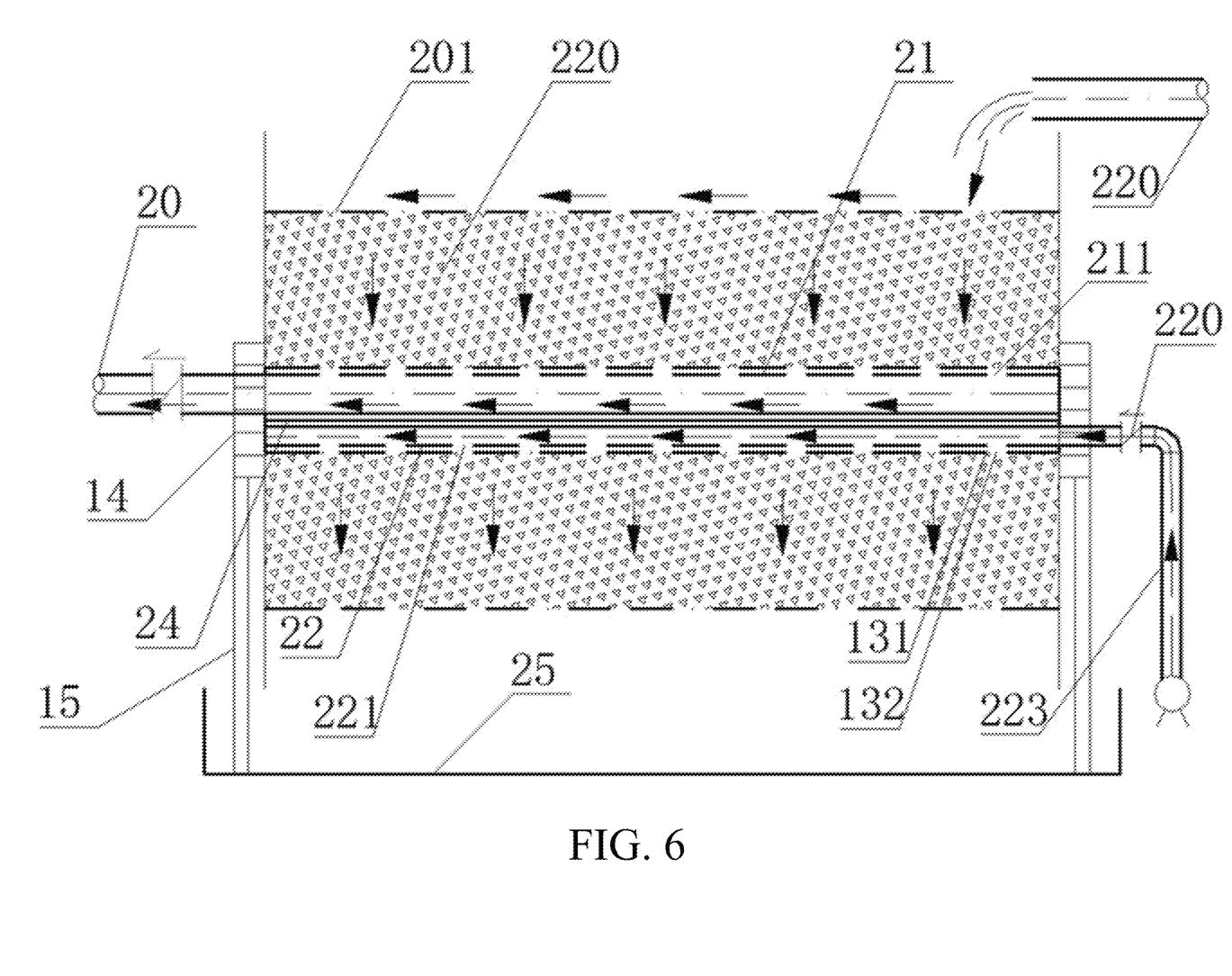
FIG. 6 is a front view of the high salinity wastewater treatment system, provided according to the present application, in steps S3 to S6 during operation including step S6.

As shown in FIG. 6, a cleaning water storage area 25 is provided directly below the wastewater treatment area 12, and the cleaning water storage area 25 is configured to receive the water flowing out of the wastewater treatment area from the cleaning filler water distribution pipe 22. After the cleaning water from the cleaning filler water distribution pipe 22 enters each separate treatment sector and cleans the hydrogel filler therein, the water gradually drips under gravity into the cleaning water storage area 25 through the high salinity wastewater inlet meshes 201 on the surface of the wastewater treatment area 12.

A thickness of the hydrogel filler in each separate treatment is 300 mm, and a filling rate of the built-in hydrogel material is 60%; each separation plate 11 is welded to the water distribution bin 13 and subjected to waterproof treatment; the six separation plates 11 are made of stainless steel; and the water distribution bin 13 has a cylindrical water distribution bin housing 131 which has a diameter of 200 mm and is made of stainless steel.

A working principle of the high salinity wastewater treatment system provided according to the present application is as follows:

S1: the to-be-treated high salinity wastewater is fed into the high salinity wastewater treatment system through the high salinity wastewater inlet pipe 20 of the flow-storage different-oriented-inlet-and-outlet system 2, and gradually infiltrates into the hydrogel loading system 1 through the high salinity wastewater inlet meshes 201 on the surface of the wastewater treatment area 12, and the control system starts timing;

wherein the hydrogel loading system 1 is filled with the hydrogel filler configured to absorb and remove pollutants from the high salinity wastewater;

S2: the control system records a filling time T after the high salinity wastewater fills up the first separate treatment sector 121 in the hydrogel loading system 1;

S3: the control system opens the water outlet pipe 20 after the first separate treatment sector 121 is filled up with the high salinity wastewater, and the hydrogel loading system 1 discharges the high salinity wastewater in the first separate treatment sector 121, that is, the purified high salinity wastewater in the first separate treatment sector 121 enters the wastewater cleaning outlet pipe 21 through the row of the wastewater cleaning outlet holes 211 opening vertically upward to discharge the high salinity wastewater in the first separate treatment sector 121;

S4: the rotating shaft 14 in the hydrogel loading system 1 is driven to rotate by the driving motor 18, the first separate treatment sector 121 in the hydrogel loading system is rotated by 60° to enter a position where the second separate treatment sector 122 is previously located, and the second separate treatment sector 122 to the sixth separate treatment sector 126 are rotated by 60° simultaneously;

S5: the control system opens the cleaning filler water inlet pipe 223 of the flow-storage different-oriented-inlet-and-outlet system 2 to introduce cleaning water to clean the first separate treatment sector 121 after step S3 is repeated for three times, and the control system controls a water inlet time for cleaning to be 0.3 T to 0.4 T;

S6: the introduced cleaning water drips into the cleaning water storage area 25 through the high salinity wastewater inlet meshes 201 on the surface of the wastewater treatment area 12 under gravity, completing the cleaning of the first separate treatment sector 121; and S7: steps S3 to S6 are repeated to continuously remove pollutants in the high salinity wastewater.

The system provided according to the present application includes the hydrogel loading system 1 and the flow-storage different-oriented-inlet-and-outlet system 2 which is nested in the hydrogel loading system 1, the wastewater treatment area has the hollow cylindrical structure and is separated into the sixth separate treatment sectors by the separation plates, that is, the first separate treatment sector 121 to the sixth separate treatment sector 126. Specifically, the separation plate 11, the filter screen 17 and the housing of the wastewater treatment area jointly form a closed sector-shaped prismatic structure, and each separate treatment sector is inside filled with the hydrogel material with water purification effect.

An internal hollow portion of the hydrogel loading system 1 is the water distribution bin 13. The water distribution bin 13 is inside provided with the wastewater cleaning outlet pipe 21 and the cleaning filler distribution pipe 22 which are tangent to each other and have a same water flow direction, and is separated up and down by the pipe separation plate 24. Preferably, a diameter of the wastewater cleaning outlet pipe 21 is larger than that of the cleaning filler water distribution pipe 22. The wastewater entering the system from the high salinity wastewater inlet pipe 23 passes through the wastewater cleaning outlet holes 211 on the wastewater cleaning outlet pipe 21 and the water distribution outlet holes 132 on the water distribution bin 13 in a listed sequence, to continuously supply water to each separate treatment sector in sequence. The cleaning water entering the system from the cleaning filler water distribution pipe 22 passes through the cleaning filler water distribution holes on the cleaning filler water distribution pipe and the water distribution outlet holes on the water distribution bin in a listed sequence to continuously supply water to each separate treatment sector in sequence. The separate treatment sectors and the water distribution bin 13 are fixedly connected. The hydrogel loading system 1 is controlled by the control system to perform a periodic rotation of 60° each time, and the wastewater cleaning outlet pipe 21 and the cleaning filler water distribution pipe 22 do not rotate with the hydrogel loading system 1, so as to realize continuous treatment of the wastewater and the continuous cleaning of the hydrogel loading system 1. The high salinity wastewater treatment system according to the present application can realize repeated utilization of the adsorbent while heavy metals in the high salinity water are treated, and has the advantages of strong stability, simple maintenance, long service life and the like.

Second Embodiment

The difference between this embodiment and the first embodiment is that in the high salinity wastewater treatment system in this embodiment, the diameter of the water distribution bin 13 is 225 mm, and the hole diameter of the filter screen 17 is 50% of the diameter of the water distribution outlet hole 132.

The diameter of each wastewater cleaning outlet hole 211 is 115% of the diameter of the corresponding water distribution outlet hole 132; and the diameter of each water distribution outlet hole 132 is 4 mm. The diameter of the water outlet pipe 20 is 175 mm, the diameter of the cleaning filler water inlet pipe 223 is 25% of the diameter of the water distribution bin 13, and the diameter of each high salinity wastewater inlet mesh 201 is 6 mm.

The thickness of the hydrogel filler in each separate treatment sector is 550 mm, and the filling rate of the built-in hydrogel material is 75%; and the water distribution bin housing has a diameter of 1500 mm and is made of stainless steel.

Third Embodiment

The difference between this embodiment and the first embodiment is that in the high salinity wastewater treatment system in this embodiment, the diameter of the water distribution bin 13 is 350 mm, and the hole diameter of the filter screen 17 is 75% of the diameter of the water distribution outlet hole 132.

The diameter of each wastewater cleaning outlet hole 211 is 120% of the diameter of the corresponding water distribution outlet hole 132; and the diameter of each water distribution outlet hole 132 is 6 mm. The diameter of the water outlet pipe 20 is 250 mm, the diameter of the cleaning filler water inlet pipe 223 is 30% of the diameter of the water distribution bin 13, and the diameter of each high salinity wastewater inlet mesh 201 is 10 mm.

The thickness of the hydrogel filler in each separate treatment sector is 800 mm, and the filling rate of the built-in hydrogel material is 90%; and the water distribution bin housing has a diameter of 2500 mm and is made of stainless steel.

Based on the embodiments of the present application, all other embodiments obtained by those skilled in the art without creative efforts fall into the scope of protection of the present application.

It should be noted that, the terms "first", "second" and the like in the present application are used only for description, and should not be construed as indicating or implying relative importance or implying the number of the indicated technical features. Therefore, the features defined with "first" and "second" can include at least one of the features explicitly or implicitly. In addition, the technical solutions between the various embodiments can be combined with each other, but must be on the basis that those technical solutions can be implemented by a person of ordinary skill in the art. If the combination of technical solutions conflicts or cannot be achieved, it should be considered that such a combination of technical solutions does not exist, and does not fall within the scope of protection claimed by the present application.

It should be noted that, all directional indicators (such as up, down, left, right, front, back, . . . ) in the embodiments of the present application are only used for explaining a relative position relationship and movement situation among components in a certain specific posture as shown in the attached figure. If the specific posture changes, the directional indicators will change accordingly. The connection described in the present application may be direct or indirect.

Although the present application has been described with reference to the preferred embodiments, various improvements can be made to it and the components therein can be replaced with equivalents, without departing from the scope of the present application. In particular, as long as there is no structural conflict, the various technical features mentioned in the various embodiments can be combined in any manner. The present application is not limited to the specific embodiments disclosed herein, but includes all technical solutions falling within the scope of the claims.

What is claimed is:

1. A high salinity wastewater treatment system, comprising a hydrogel loading system and a flow-storage different-oriented-inlet-and-outlet system which is nested in the hydrogel loading system;

the hydrogel loading system comprises six separation plates, a wastewater treatment area with a hollow cylindrical structure, a cylindrical water distribution bin located at an axis of the wastewater treatment area, a rotating shaft fixedly connected with the six separation plates, a driving motor configured to drive the rotating shaft to rotate, and a fixing bracket fixedly connected with the driving motor and configured to support the hydrogel loading system; each separation plate is arranged to protrude from an outer surface of the wastewater treatment area;

the six separation plates are evenly distributed in the wastewater treatment area of the hydrogel loading system, to evenly separate the wastewater treatment area into six separate treatment sectors in an axial direction: a first separate treatment sector, a second separate treatment sector, a third separate treatment sector, a fourth separate treatment sector, a fifth separate treatment sector, and a sixth separate treatment sector; the six separate treatment sectors are inside filled with hydrogel materials with water purification effect;

the wastewater treatment area, the water distribution bin and the rotating shaft are coaxial with each other;

the flow-storage different-oriented-inlet-and-outlet system comprises a high salinity wastewater inlet pipe, high salinity wastewater inlet meshes located on the outer surface of the wastewater treatment area below the high salinity wastewater inlet pipe, a wastewater cleaning outlet pipe and a cleaning filler water distribution pipe which are located in the water distribution bin, a cleaning filler water inlet pipe configured to deliver water to and connect with the cleaning filler water distribution pipe, a pipe separation plate, and a water outlet pipe connected with the wastewater cleaning outlet pipe;

the high salinity wastewater inlet meshes are provided on the surface of the wastewater treatment area, and the high salinity wastewater introduced from the high salinity wastewater inlet pipe flows into the uppermost separate treatment sector through the high salinity wastewater inlet meshes;

the wastewater cleaning outlet pipe and the cleaning filler water distribution pipe are arranged in the water distribution bin and have a same flow direction in the axial direction, and the pipe separation plate separates the wastewater cleaning outlet pipe from the cleaning filler water distribution pipe in a radial vertical direction of the water distribution bin; the wastewater cleaning outlet pipe and the cleaning filler water distribution pipe are tangent to an inner wall of the water distribution bin;

the wastewater cleaning outlet pipe is provided with a row of wastewater cleaning outlet holes opening vertically upward in the axial direction and arranged in sequence; and the cleaning filler water distribution pipe is provided with a row of cleaning filler water distribution holes opening vertically downward in the axial direction and arranged in sequence.

2. The high salinity wastewater treatment system according to claim 1, wherein a diameter of the water distribution bin ranges from 100 mm to 350 mm, the water distribution bin comprises a water distribution bin housing and at least one row of water distribution outlet holes, the at least one row of water distribution outlet holes are arranged in sequence on a surface of the water distribution bin housing, opening vertically upward in the axial direction and facing the first separate treatment sector, centers of the row of wastewater cleaning outlet holes are in one-to-one correspondence with centers of one row of water distribution outlet holes at the first separate treatment sector; and a filter screen is placed on a contact surface between each separate treatment sector and the water distribution bin, and a hole diameter of the filter screen ranges from 20% to 75% of a diameter of each water distribution outlet hole.

3. The high salinity wastewater treatment system according to claim 2, wherein the number of rows of the water distribution outlet holes arranged in sequence on the surface of the water distribution bin housing in the axial direction is six, and the six rows of the water distribution outlet holes are evenly distributed along a circumferential direction of a cross-section of the water distribution bin.

4. The high salinity wastewater treatment system according to claim 1, wherein a diameter of each wastewater cleaning outlet hole ranges from 110% to 120% of a diameter of the corresponding water distribution outlet hole; and the diameter of each water distribution outlet hole ranges from 2 mm to 6 mm.

5. The high salinity wastewater treatment system according to claim 1, wherein a diameter of the water outlet pipe ranges from 100 mm to 250 mm; the wastewater cleaning outlet pipe is provided with a wastewater cleaning outlet baffle which is distributed on a pipe wall of the wastewater cleaning outlet pipe, so that the water flowing out from the wastewater treatment area enters the wastewater cleaning outlet pipe and does not flow into the water distribution bin.

6. The high salinity wastewater treatment system according to claim 1, wherein a cleaning water inlet check valve is arranged on the cleaning filler water inlet pipe to control water inlet of the cleaning filler water inlet pipe, and a diameter of the cleaning filler water inlet pipe ranges from 20% to 30% of the diameter of the water distribution bin.

7. The high salinity wastewater treatment system according to claim 1, wherein the cleaning filler water distribution pipe is provided with a cleaning filler water distribution baffle; the cleaning filler water distribution baffle is distributed on a pipe wall of the cleaning filler water distribution pipe, so that the water flowing out from the cleaning filler water distribution pipe enters the wastewater treatment area and does not flow into the water distribution bin.

8. The high salinity wastewater treatment system according to claim 1, wherein the high salinity wastewater inlet meshes are arranged outside the wastewater treatment area, and the high salinity wastewater inlet meshes located in the separate treatment sectors are independently arranged, and a hole diameter of each high salinity wastewater inlet mesh ranges from 2 mm to 10 mm.

9. The high salinity wastewater treatment system according to claim 8, wherein a cleaning water storage area is provided directly below the wastewater treatment area, and the cleaning water storage area is configured to receive the water flowing out of the cleaning wastewater treatment area from the cleaning filler water distribution pipe.

10. The high salinity wastewater treatment system according to claim 1, wherein a thickness of a hydrogel filler in each separate treatment sector ranges from 300 mm to 800 mm, and a filling rate of the built-in hydrogel filler ranges from 60% to 90%; each separation plate is welded to the water distribution bin and subjected to waterproof treatment; the separation plates are made of stainless steel; and the water distribution bin has a cylindrical water distribution bin housing which has a diameter ranging from 200 mm to 2500 mm and is made of stainless steel.

\* \* \* \* \*